United States Patent [19]

Nagae

[11] Patent Number: 5,151,992
[45] Date of Patent: Sep. 29, 1992

[54] PERSONAL COMPUTER FOR CUTTING OFF POWER WHEN A LOCK MECHANISM OF HARD DISK PACK IS RELEASED

[75] Inventor: Akihito Nagae, Tokyo, Japan

[73] Assignee: Kabushiki Kaisha Toshiba, Kawasaki, Japan

[21] Appl. No.: 591,269

[22] Filed: Oct. 1, 1990

[30] Foreign Application Priority Data

Oct. 3, 1989 [JP] Japan .................................. 1-258155

[51] Int. Cl.$^5$ .......................... G06F 9/00; G06F 1/00; G06F 11/00
[52] U.S. Cl. ................................ 395/750; 364/264.2; 364/273.2; 364/948.4; 364/969.2; 364/970.5; 364/970.2
[58] Field of Search ....................... 364/200, 900, 707; 395/750

[56] References Cited

U.S. PATENT DOCUMENTS

| | | | |
|---|---|---|---|
| 4,549,296 | 10/1985 | Castel et al. | 371/14 |
| 4,680,674 | 7/1987 | Moore . | |
| 4,941,841 | 7/1990 | Darden et al. | 439/377 |
| 4,980,836 | 12/1990 | Carter et al. | 364/483 |
| 5,014,193 | 5/1991 | Garner et al. | 371/11.1 |
| 5,038,320 | 8/1991 | Heath et al. | 371/11.1 |
| 5,041,924 | 8/1991 | Blackborow et al. | 360/69 |

FOREIGN PATENT DOCUMENTS

WO88/06780 9/1988 PCT Int'l Appl. .

OTHER PUBLICATIONS

Patent Abstracts of Japan, vol. 12, No. 362(E-663), Sep. 28, 1988, and JP-A-63-115427, May 20, 1988, U. Shinjiro, "Individual Selection Call Receiver with Display Function".

Primary Examiner—Dale M. Shaw
Assistant Examiner—Robert S. Hauser
Attorney, Agent, or Firm—Oblon, Spivak, McClelland, Maier & Neustadt

[57] ABSTRACT

A personal computer system is provided with a detachable hard disk pack, a lock mechanism for locking the hard disk pack into the system, a switch which turns on and off in cooperation with the lock and release operations of the lock mechanism. When the hard disk pack is detached from the system, while the system is being powered, the switch turns off in cooperation with the release operation of the lock mechanism. In response to the changed state of the switch, the NMI control section outputs an NMI signal to the CPU. In response to the NMI signal, the CPU instructs a power controller to cut off the power. The CPU determines in response to the system being powered if the hard disk pack is attached to the system. If the hard disk pack is not attached, the CPU instructs the power controller not to supply the power to the system.

8 Claims, 6 Drawing Sheets

PERSONAL COMPUTER FOR CUTTING OFF POWER WHEN A LOCK MECHANISM OF HARD DISK PACK IS RELEASED

BACKGROUND OF THE INVENTION

1. Field of the Invention

The present invention relates to a personal computer having a detachable hard disk drive (HDD).

2. Description of the Related Art

Hard disk drives (HDDs) have been made smaller and smaller, and their memory capacity has become greater. For their decreased size and increased memory capacity, the HDDs are now incorporated not only in desk-top personal computers, but also in lap-top personal computers. Very recently, a lap-top personal computer has been developed which comprises not only a detachable display but also a detachable HDD. Since the detachable HDD is small and light, the lap-top computer is smaller, lighter and more portable than the prior-art personal computers.

A personal computer having a detachable HDD has a lock mechanism for locking the HDD. The supply of power to the personal computer must, therefore, be stopped before the HDD is attached to or detached from the main body, while power is being supplied to the main body of the computer, noise will be generated and may cause the HDD or the system board of the computer to malfunction.

SUMMARY OF THE INVENTION

An object of the present invention is to provide a personal computer having a mechanism for preventing a malfunction caused by detachment of a hard disk pack while power is being supplied to the main body of the computer.

According to a first aspect of the present invention, a computer system comprises: power supply means for supplying power to said computer system; external storage medium means connectable to said computer system; lock means for locking said external storage medium means when it is attached to said computer system, and for releasing said external storage medium means when it is detached from said computer system; switch means which turns on and off in cooperation with the lock and release operations of said lock means, respectively; specified signal generating means for outputting a specified signal in response to a changed state of said switch means; and control means for cutting off the supplement of power from said power supply means in response to the specified signal.

According to a second aspect of the present invention, as power controlling method for a computer system having a central processing unit (CPU), a power supply for supplying power, an external storage medium detachably connected to the computer system, a lock mechanism for locking the external storage medium to said computer system and a switch which turns on and off in cooperation with the lock and release operations of the lock mechanism, comprises: a) detecting a changed state of the switch in cooperation of the release operation of the lock mechanism in response to the detachment of the external storage medium from the computer system; b) outputting a non-maskable interrupt (NMI) signal to the CPU in response to the changed state of the switch; and c) cutting off the supplement of power in response to the NMI signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 6 is a flowchart showing a processing for cutting off the supplement of power from a power supply if the hard disk pack is not connected when the power is turned on; and FIG. 7 is a flowchart showing a terminating processing of the hard disk pack and a processing for cutting off the supplement of power from the power supply in response to the detachment of the hard disk pack when the power is turned on.

DETAILED DESCRIPTION OF THE PREFERRED EMBODIMENT

Figure 1:
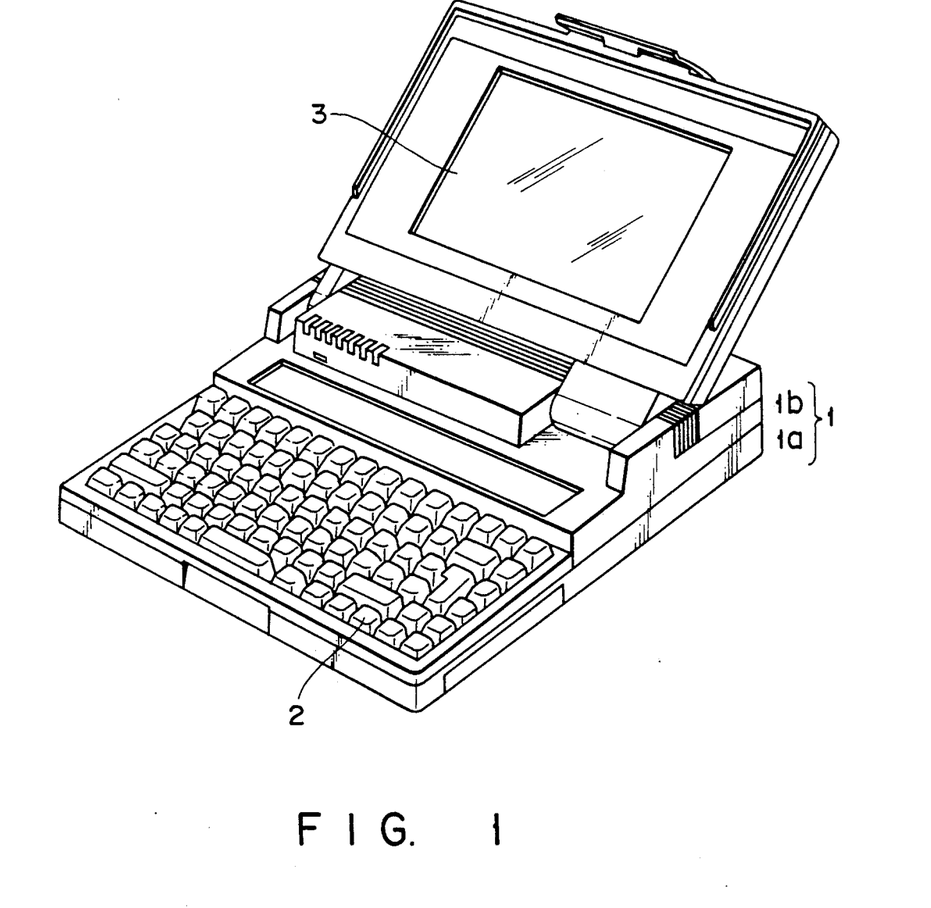
FIG. 1 is a perspective view showing an embodiment of a personal computer according to the present invention.

FIG. 1 is a perspective view showing a lap-top personal computer according to an embodiment of the present invention. As is illustrated in FIG. 1, the lap-top computer has a main body 1 shaped like a thin rectangular box. The main body 1 comprises an open bottom case 1a and a top cover 1b covering the bottom case 1a. The top cover 1b consists of a thin front half and a thick rear half. A keyboard 2 is incorporated in the front portion of the top cover 1b.

A flat-panel type display 3 is hinged to the rear half of the top cover 11b. This display 3 can be rotated between a closed position and an open position. In the closed position, the display covers the keyboard 1. In the open position, it is held up and located at the rear of the keyboard 2. Hence, the display 3 can take any position between the closed and open positions, inclined at a desired angle to the top cover 1b.

The bottom case 1a contains a print circuit board 4. Various electronic components such as ICs are mounted on the print circuit board 4.

Figure 2:
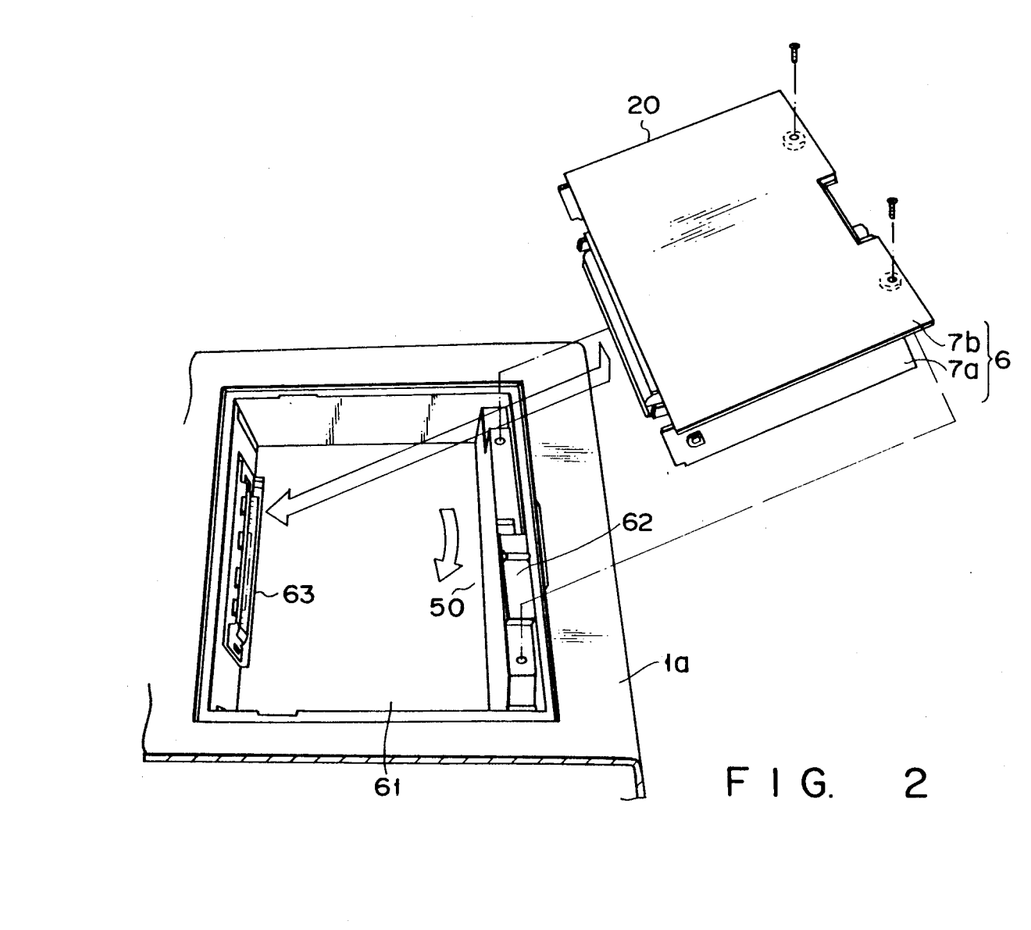
FIG. 2 is a perspective view showing a lock mechanism in the embodiment.

As is shown in FIG. 2, a hard disk pack 20, used as a media-driving unit, is removably mounted on the bottom case 1b. The hard disk pack 20 comprises a rectangular case 6. The case 6 consists of a rectangular open box 7a and a cover 7b closing the opening of the box 7a. The cover 7b is fastened to the box 7a by screws. The case 6 contains a hard disk (not shown), a magnetic head (not shown either), and some other components. The magnetic head is designed to write data on or reading data from the hard disk.

A recess 61 is made in the bottom of the bottom case 1a, for accommodating the hard disk pack 20. When the hard disk pack 20 is inserted into the recess 61, it is electrically connected to the printed circuit board 4 by a connector 63. A lock mechanism 50 is located in the rear portion of the recess 61. The lock mechanism 50 is designed to hold the hard disk pack 20 in place within the recess 61. It has a slide 62. When the slide 62 is moved in the direction of the arrow (FIG. 2), the hard disk pack 20 is released from the lock mechanism. When the slide 62 is moved in the opposite direction, the hard disk pack 20 is locked by the lock mechanism.

Figure 3:
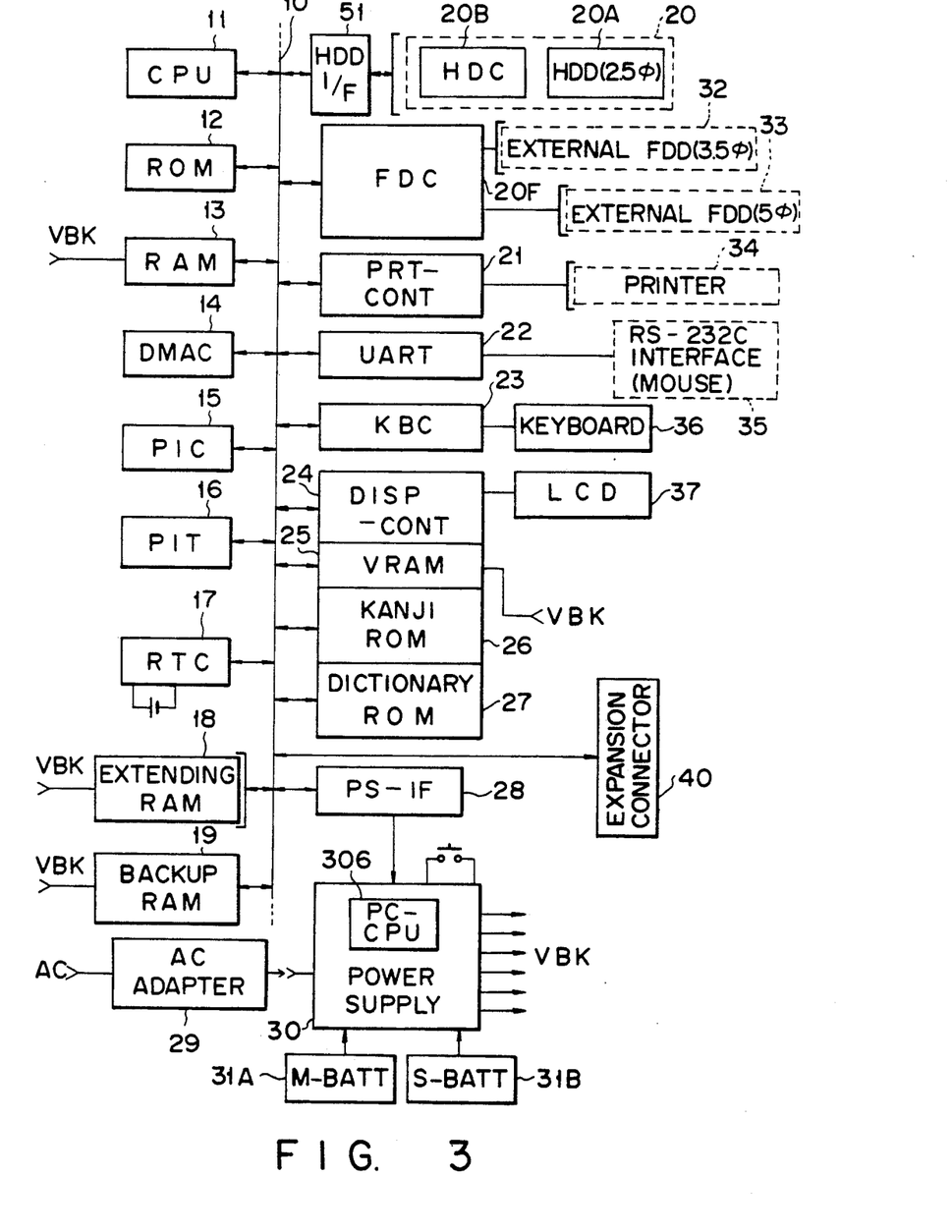
FIG. 3 is a block diagram showing an arrangement of an entire system of a personal computer of the present invention.

FIG. 3 is a system diagram of the embodiment of a personal computer of the present invention.

As is shown in FIG. 3, the computer comprises a system bus 10 and components 11 to 28, and 51 connected to the bus 10. These components are: a main CPU (Central Processing Unit) 11, a ROM (Read Only Memory) 12, a RAM (Random Access Memory) 13, a DMAC (Direct Memory Access Controller) 14, a PIC (Programmable Interrupt Controller) 15, a PIT (Programmable Interval Timer) 16, and a RTC (Real Time Clock) 17.

Figure 6:
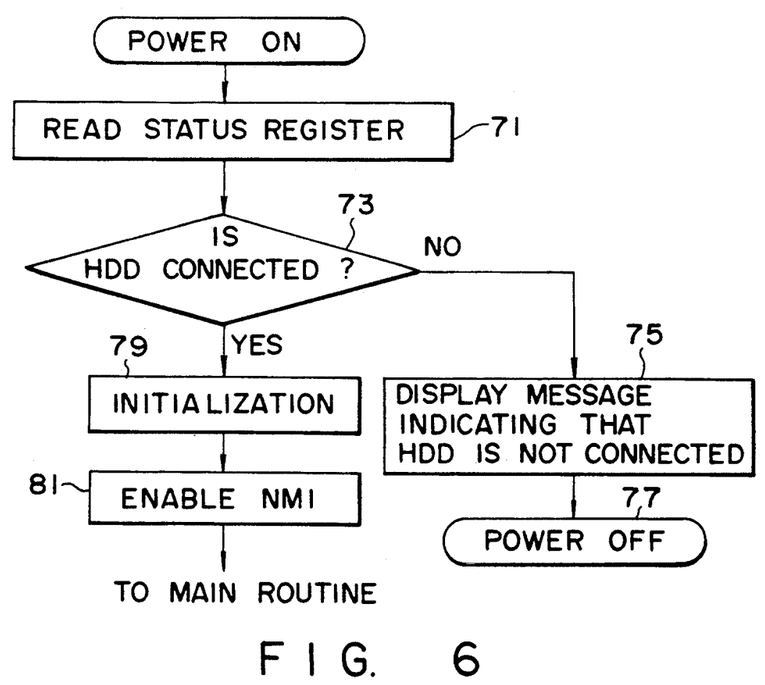
Figure 7:
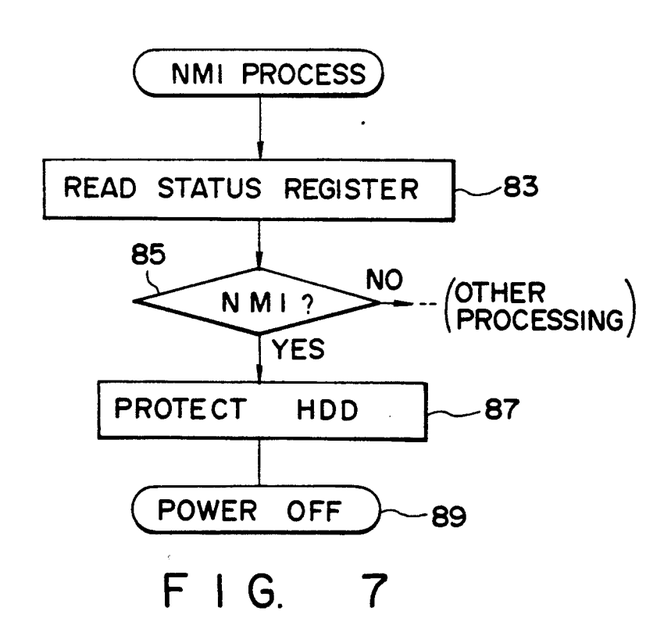

The main CPU (Central Processing Unit) 11 controls an entirety of the system, and executes the various routines represented by the flowcharts shown in FIGS. 6 and 7. The main CPU 11 serves as a host CPU to the power control CPU 306 incorporated in the power supply circuit 30 to be described later.

The ROM 12 stores a basic input and output program (BIOS). The BIOS includes the program shown in FIGS. 6 and 7. The main CPU 11 executes the BIOS when the power switch of the computer is turned on to read the setup data stored in a specific area of the RAM 13 (or register) to determine the system environment, to further read a boot block from a hard disk drive (HDD) 20A, and to load an disk operation system (DOS) program stored in the HDD 20A into the RAM 13. The RAM 13 stores the DOS (Disk Operating System) program, application programs, and various data. Backup power VBK is supplied to the RAM 13 from the power-supply circuit 30. Hence, the data stored in the RAM 13 is not vanished even if the power switch of the computer is turned off.

The DMAC 14 performs a direct memory access control. The PIC 15 can be set by a program. The PIT 16 can be set by a program and supplies an interrupt signal to the main CPU 11 under control of the PIC 15 when its count reaches a value set by a program. In response to the interrupt signal, the main CPU 11 executes vector interrupt processing routine. The RTC 17 is a timer module which has a dedicated built-in battery (not shown) and measures time; its output represents the present time.

As is shown in FIG. 3, the personal computer further comprises an extended RAM 18, a backup RAM 19, a hard disk pack 20, a floppy disk controller (FDC) 20F, a printer controller (PRT-CONT) 21, an I/O interface 22, a keyboard controller 23, a display controller 24, a video RAM 25, a Kanji ROM 26, a dictionary ROM 27, and a power-supply interface 28—all connected to the system bus 10.

The extended RAM 18 is a large-capacity memory removably inserted in the card slot formed in one side of the main body of the personal computer, and the backup power VBK is supplied to the extended RAM 18. The backup RAM 19 is also supplied with the backup power VBK and keeps storing the data required to perform a resume function. The hard disk pack 20 is removably set in a dedicated housing made in one side of the main body of the computer, and consists of, for example, a 2.5-inch hard disk drive (HDD) 20A and a hard disk controller (HDC) 20B. The floppy disk controller (FDC) 20F controls an external 3.5-inch floppy disk drive 32 and a 5-inch external floppy disk drive 33 both optionally connected to the personal computer. The printer controller 21 is connected to a printer 34 externally connected to the computer. The I/O interface 22 is a universal asynchronous receiver/transmitter (UART). If necessary, RS-232C interface units are connected to the I/O interface 22. The keyboard controller (KBC) 23 controls the keyboard 36. The display controller (DISP-CONT) 24 controls a liquid crystal display (LCD) 37. The video RAM (VRAM) 25 is supplied with the backup power BBK and stores video data. The Kanji ROM 26 stores the patterns of Kanjis (Chinese characters) correspond to Kanji codes. The dictionary ROM 27 stores a table showing the correspondence between Kanjis and the corresponding spellings in Kanas (Japanese syllabics), which is used to convert words spelled in Kanas are converted to words spelled in Kanjis. The power-supply control interface (PS-IF) 28 connects the power-supply circuit 30 to the main CPU 11 through the system bus 10.

When necessary, an AC adapter 29 is plugged into the main body of the personal computer. It rectifies the commercially available AC power into a DC power of a predetermined voltage. An expansion connector 40 is connected at one end to the system bus 10. An expansion unit is selectively connected to the other end of the connector 40. The power-supply circuit 30 (an intelligent power supply) has a power control CPU (PC-CPU) 306. A main battery 31A, which is a chargeable battery pack, is removably mounted on the main body of the personal computer. A sub-battery 31B, which is also chargeable, is incorporated in the main body of the computer.

Figure 4:
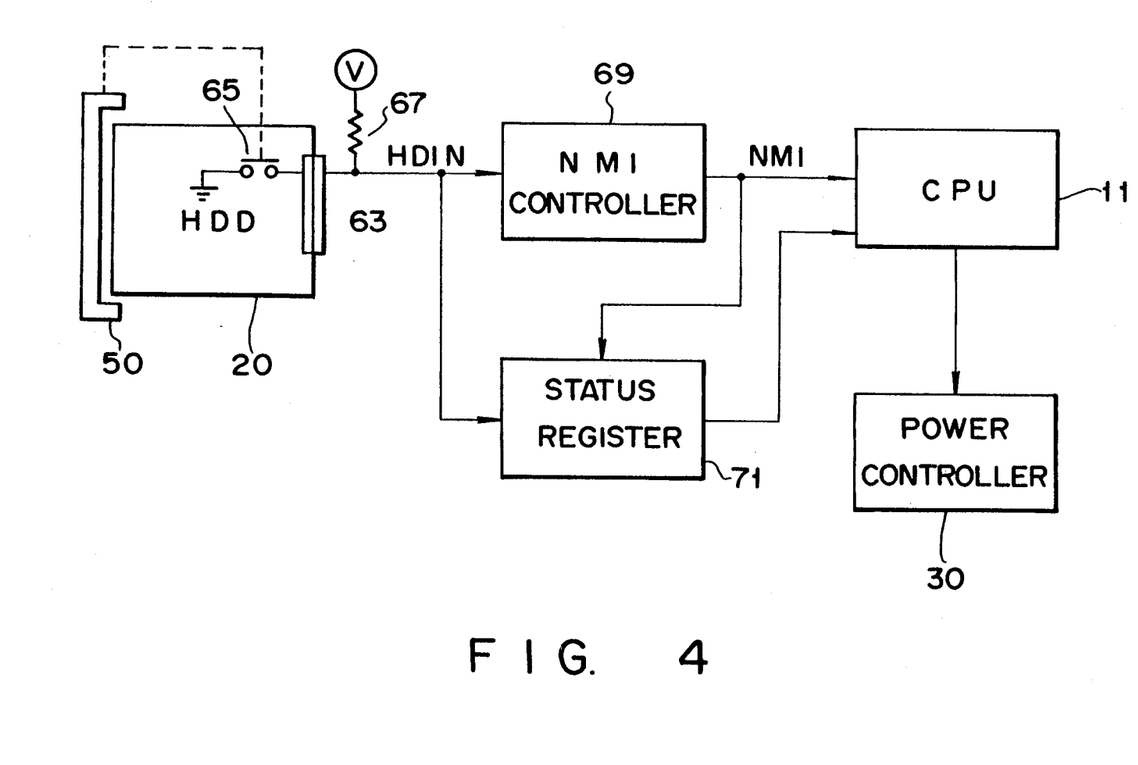
FIG. 4 is a block diagram showing a control circuit for cutting off the supplement of power in response to the detachment of the hard disk pack in the above embodiment.

FIG. 4 is a block diagram showing an electronic control performed in response to the attachment and detachment of the hard disk pack 20. The hard disk pack 20 is detachable from the system main body. When the hard disk pack 20 is attached to the system main body, the lock mechanism 50 is operated to lock the hard disk pack 20 into the system main body. The switch 65 is actuated in cooperation with the operation of the lock mechanism 50. When the hard disk pack 20 is detached from the system main body, the lock mechanism 50 is released. Accordingly, the switch 65 is turned off in cooperation with the lease operation. One terminal of switch 65 is connected to the ground and the other terminal thereof is connected to a specified pin of the connector 63. The specified pin of the connector 63 is connected to Vcc through a pull-up resistor 67. As a result, when the hard disk pack 20 is not connected to the system main body, the high level (logic "1") HDIN signal is output. When the hard disk pack 20 is attached to the system, a low level (logic "0") HDIN signal is output.

As described above, in a conventional personal computer, a noise caused by removing the hard disk pack 20 from the connector 63 effects a bad influence on an IC board of the system. Accordingly, in the determination of the attachment or detachment of the hard disk pack 20 from the system main body is output when the pack 20 is removed from the connector 63, the noise would have already been caused. Therefore, the switch 35 is detected in order to detect the detachment of the pack 20 before the pack 20 is removed from the connector 63.

The HDIN signal is supplied to a nonmaskable interrupt controller (NMI) 69 and a status register 71. Both the NMI controller 69 and the status register 71 are provided within the hard disk interface 51 shown in FIG. 3. The NMI controller 69 supplies the NMI signal when the HDIN signal is changed from the high level to the low level or the low level to the high level in response to the attachment or detachment of the hard disk pack 20 from the system main body. The status register 71 holds the level states of the HDIN signal and the NMI signal. The CPU 11 is connected to both the NMI controller 69 and the status register 71. The CPU 11 executes the program shown in FIG. 7 in response to the NMI signal from the NMI controller 69. Further, the CPU 11 executes the program shown in FIG. 6 in response to the system being powered. When the hard disk pack 20 is detached from the system while the power is being supplied to the system, the CPU 11 instructs the power controller 30 to cut off the power. When the system is powered while the hard disk pack 20 is not being attached to the system, the CPU 11 instructs the power controller 30 not to supply the power. In response to the instruction from the CPU 11, the power controller 30 cuts off the power.

Figure 5:
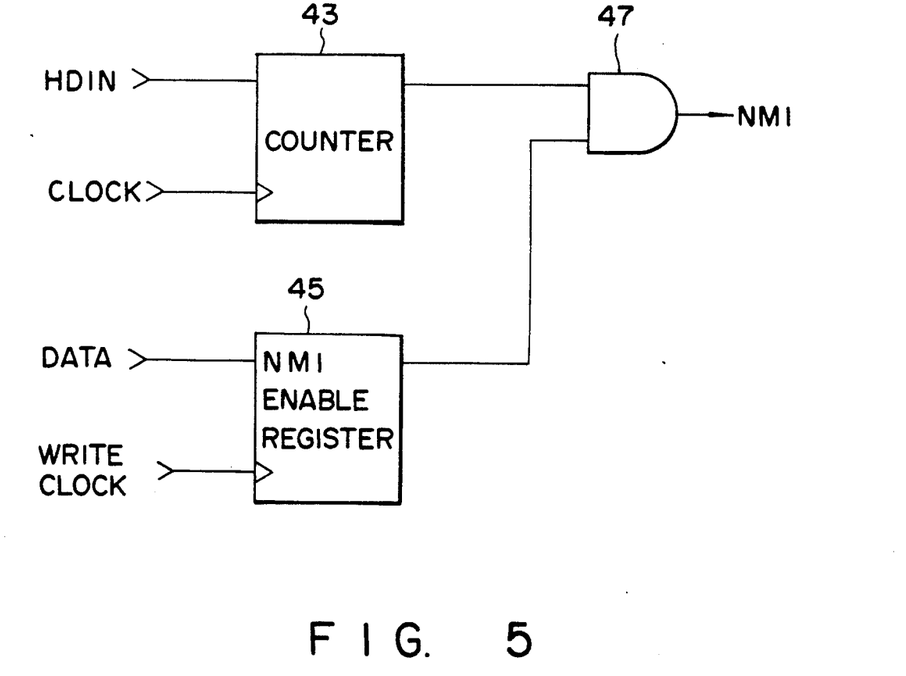
FIG. 5 is a circuit diagram showing a detail of an NMI control circuit shown in FIG. 4.

FIG. 5 is a block diagram showing a detail of the NMI controller 69.

The NMI controller 39 is provided with a counter 43, an NMI enable register 45 and an AND gate 47. The counter 43 counts a predetermined period of time in response to the clock signal to detect that the HDIN signal falls into the low level for the predetermine period of time. The NMI enable register 45 holds an enable flag in response to a step of enabling the NMI signal shown in FIG. 6. The AND gate 47 supplies the HDIN signal from the counter to the CPU 11 as the NMI signal only when the enable flag held in the NMI enable register is set.

An operation of the above embodiment will now be described with reference to FIGS. 6 and 7.

When the system is powered, the CPU 11 reads the status data (a level of the HDIN signal) held in the status register 71. More specifically, the CPU 11 determines in step 73 that the hard disk pack 20 is not connected to the system if the HDIN signal is at a high level. Then, the CPU 11 displays on the display unit 37 in step 75 that a message indicating that the hard disk pack 20 is not connected to the system. Furthermore, the CPU 11 instructs the power controller 30 not to supply power to the system. This control is performed when a user turns on a power switch of the system while the hard disk pack 20 is not being attached to the system. Since the system is not powered while the pack 20 is not being attached to the system, the bad influence on the IC board can be prevented, which has been caused in a conventional personal computer when the pack 20 is attached to the system while the system is being powered.

On the other hand, upon determining in step 73 that the HDIN signal is at a low level, i.e., the hard disk pack 20 is connected to the system, the CPU 11 initializes the system in step 79 and sets the NMI enable flag in the NMI enable register 45 in step 81.

When the hard disk pack 20 is detached from the system while the system is being powered, the lock mechanism 20 is released. In cooperation with the release operation of the lock mechanism 50, the switch 65 is turned off. Accordingly, a high-level HDIN signal is set in the status register 71 by the pull-up resistor 67 as well as supplied to the NMI controller 69. After counting a predetermined period of time, the counter 43 in the NMI controller 69 outputs a high-level NMI signal to one of the input terminal of the AND gate 47. The other input terminal of the AND gate 47 receives a high-level enable signal from the NMI enable register 45. As a result, the AND condition is established, and the AND gate 47 outputs the NMI signal to the CPU 11 and to the status register 71.

In response to the NMI signal, the CPU 11 reads in step 83 of FIG. 7, contents of the status register 71. If the CPU 11 determines in step 85 that the content of the register 71 is the NMI signal, it advances to step 87 to terminate the operation of the hard disk drive 20B and moves the head to its home position. Then, in step 89, the CPU 11 instructs the power controller 30 to cut off the power.

Additional advantages and modifications will readily occur to those skilled in the art. Therefore, the invention in its broader aspects is not limited to the specific details, representative devices, and illustrated examples shown and described. Accordingly, various modifications may be made without departing from the spirit or scope of the general inventive concept as defined by the appended claims and their equivalents.

What is claimed is:

1. A computer system, comprising:
    a power supply for supplying power to the computer system;
    an external storage unit removably connected to said computer system;
    lock means for locking the external storage unit when it is attached to the computer system, and for releasing the external storage unit when it is removed from the computer system;
    a switch turned on and off in response to the locking and releasing operations of the lock means, respectively;
    specified signal generating means for outputting a specified signal in response to a state change of the switch means;
    storage means for storing the attachment or detachment state of the external storage unit; and
    control means, connected to the power supply and the specified signal generating means, for cutting off the power from the power supply supplied to the computer system in response to the specified signal.

2. The system according to claim 1, wherein the control means includes means for terminating a read/write operation of the external storage unit before cutting off the power from the power supply to the computer system.

3. The system according to claim 1, wherein the lock means includes a connector in which a specified pin is assigned for outputting a specified signal in response to the removal of the external storage unit.

4. The system according to claim 1, wherein the switch turns on and off when the external storage unit is attached and removed from the system, respectively.

5. The system according to claim 4, further comprising:

storage means for storing the attachment or removal state of the external storage unit;

wherein the control means includes means for determining in response to the power on of the system if the status data stored in the storage means indicates that the external storage unit is attached to the system, and for cutting off the power from the power supply means when the status data indicates that the external storage unit is not connected to the system.

6. The system according to claim 1, wherein the specified signal is a nonmaskable interrupt (NMI) signal.

7. A power controlling method for a computer system having a central processing unit (CPU), a power supply for supplying power to the computer system, an external storage unit removably connected to the computer system, a lock mechanism for locking the external storage unit to the computer system and a switch which turns on and off in response to the lock and release operations of the lock mechanism, the method comprising:

a) detecting a state change of the switch in response to the release operation of the lock mechanism in response to the removal of the external storage unit from the computer system;

b) outputting a nonmaskable interrupt (NMI) signal to the CPU in response to the changed state of the switch; and c) cutting off the power supplied to the computer system in response to the NMI signal.

8. The method according to claim 7, further comprising the steps of:

d) determining in response to the power supply being turned on if the external storage unit is attached to the system; and e) cutting off the power supplied from the power supply to the computer system in response to the determination that the external storage unit is not attached to the system.

* * * * *